(12) United States Patent
Wu et al.

(10) Patent No.: US 12,112,430 B2
(45) Date of Patent: Oct. 8, 2024

(54) METHOD, SYSTEM, AND DEVICE FOR DESCRIBING RELATIONSHIP BETWEEN OBJECTS IN A THREE-DIMENSIONAL VIRTUAL SPACE, AND MEDIUM

(71) Applicant: SHANGHAI LILITH TECHNOLOGY CORPORATION, Shanghai (CN)

(72) Inventors: Di Wu, Shanghai (CN); Zhi Cheng, Shanghai (CN)

(73) Assignee: SHANGHAI LILITH TECHNOLOGY CORPORATION, Shanghai (CN)

( * ) Notice: Subject to any disclaimer, the term of this patent is extended or adjusted under 35 U.S.C. 154(b) by 0 days.

(21) Appl. No.: 17/768,233

(22) PCT Filed: Oct. 9, 2020

(86) PCT No.: PCT/CN2020/114494
§ 371 (c)(1),
(2) Date: Apr. 12, 2022

(87) PCT Pub. No.: WO2021/088511
PCT Pub. Date: May 14, 2021

(65) Prior Publication Data
US 2024/0119670 A1 Apr. 11, 2024

(30) Foreign Application Priority Data
Nov. 7, 2019 (CN) .......................... 201911080453.9

(51) Int. Cl.
*G06T 17/00* (2006.01)
(52) U.S. Cl.
CPC .................................. *G06T 17/005* (2013.01)
(58) Field of Classification Search
CPC .................................................... G06T 17/005
See application file for complete search history.

(56) References Cited

U.S. PATENT DOCUMENTS 6,282,455 B1 * 8/2001 Engdahl ............. G05B 23/0216
700/83

FOREIGN PATENT DOCUMENTS

| CN | 101154289 A | 4/2008 |
| CN | 101661628 A | 3/2010 |

(Continued)

OTHER PUBLICATIONS

Lescinsky, Gordon, et al. "Interactive scene manipulation in the virtue3d system." Proceedings of the seventh international conference on 3D Web technology. 2002. (Year: 2002).*

(Continued)

*Primary Examiner* — Daniel F Hajnik
(74) *Attorney, Agent, or Firm* — Amster, Rothstein & Ebenstein LLP

(57) ABSTRACT

A method, system, and device for describing a relationship between objects in a three-dimensional virtual space, and a medium. The method of the present invention includes: for a first-level node under a three-dimensional virtual space node, determining that a position and a rotation direction of an object associated with the node are free; and for a node that is not a first-level node, obtaining a node type of the node and a node type of a parent node of the node, and determining that the object associated with the node maintains or does not maintain a relative position relative to an object associated with the parent node, and maintains or does not maintain a relative rotation direction relative to the object associated with the parent node.

6 Claims, 5 Drawing Sheets

(56) References Cited

FOREIGN PATENT DOCUMENTS

| CN | 102842146 A | 12/2012 |
|---|---|---|
| CN | 103186568 A | 7/2013 |
| CN | 106296779 A | 1/2017 |
| CN | 109215128 A | 1/2019 |
| JP | 2017513765 A | 6/2017 |

OTHER PUBLICATIONS

Dawei, Chen, and Tang Hongmin. "A rigid-body simulation application framework for scene graph system and its implementation." 2010 International Conference on Audio, Language and Image Processing. IEEE, 2010. (Year: 2010).*

De Laet, Tinne, Herman Bruyninckx, and Joris De Schutter. "Rigid body pose and twist scene graph founded on geometric relations semantics for robotic applications." 2013 ieee/rsj international conference on intelligent robots and systems. IEEE, 2013. (Year: 2013).*

Stamoulias, Andreas, et al. "Enhancing X3DOM declarative 3D with rigid body physics support." Proceedings of the 19th International ACM Conference on 3D Web Technologies. 2014. (Year: 2014).*

Chinese Office Action, mailed Jun. 29, 2022, For Counterpart Chinese Patent Application No. 201911080453.9 And Its English Translation.

\* cited by examiner

METHOD, SYSTEM, AND DEVICE FOR DESCRIBING RELATIONSHIP BETWEEN OBJECTS IN A THREE-DIMENSIONAL VIRTUAL SPACE, AND MEDIUM

CROSS REFERENCE TO RELATED APPLICATIONS

This application is a national phase of PCT application No. PCT/CN2020/114494, filed on Sep. 10, 2020, which claims priority from Chinese Patent Application No. 201911080453.9 filed on Nov. 7, 2019, all of which are incorporated herein by reference.

TECHNICAL FIELD

The present invention relates to the technical field of three-dimensional modeling, and in particular, to a method, a system, a device and for describing a relationship between objects in a three-dimensional virtual space, and a medium.

BACKGROUND

In a three-dimensional virtual space, there are scenes in which multiple objects are associated or cooperate with each other. To achieve association or cooperation between the multiple objects, users typically use one or more connectors, such as hinges, sliders, and/or stabilizers, to connect the multiple objects. For example, as shown in FIG. 1, a car 100 includes a car body 102 and four wheels 104, the car body 102 and the four wheels 104 may be connected by a connector such as a hinge, so that the body 102 and the four wheels 104 are associated and cooperate with each other, when the car body 102 moves, the four wheels 104 can rotate together along a moving direction of the car body 102.

In existing three-dimensional modeling platforms such as Roblox and Unity, object to be connected needs to be specified in properties of the connector. For example, as shown in FIG. 2, for the car body 102 and one wheel 104 to be connected, a first attachment node Attachment1 is created under a car body node CarBody, which corresponds to a first attachment point 106 in FIG. 1, a second attachment node Attachment0 is created under a wheel node Wheel, which corresponds to a second attachment point 108 in FIG. 1, and a hinge node HingeConstraint is created. As shown in FIG. 3, in properties of the hinge node HingeConstraint, the first attachment node Attachment 1 and the second attachment node Attachment0 to be connected are specified, and directions of the hinges that are free to rotate can be determined according to direction properties of the first attachment node Attachment 1 and the second attachment node Attachment0.

However, in the above existing solution, the relationship between multiple objects associated with multiple nodes cannot be intuitively described. For example, as shown in FIG. 2, the relationship between the car body associated with the car body node, the wheel associated with the wheel node, and the hinge associated with the hinge node cannot be intuitively displayed, so that the user cannot quickly and easily understand the multiple objects in the three-dimensional virtual space. In addition, the user needs to manually specify the objects to be connected in the properties of the connector to determine relative positions and relative rotation directions of the multiple objects in the three-dimensional virtual space, and consequently it is inconvenient to perform operations.

SUMMARY

An objective of the present invention provides a method, a system, and a device for describing a relationship between objects in a three-dimensional virtual space, and a medium, to intuitively describe the relationship between multiple objects in the three-dimensional virtual space, to implement editing visualization, and reduce understanding costs of users, and relative positions and relative rotation directions of the multiple objects in the three-dimensional virtual space can be automatically determined, and therefore it is convenient for users to perform operations.

An implementation of the present invention discloses a method for describing a relationship between objects in a three-dimensional virtual space, wherein the objects in the three-dimensional virtual space are associated with nodes arranged as a tree structure under a three-dimensional virtual space node, and the method comprises:

determining whether a node of the nodes is a first-level node under the three-dimensional virtual space node;

when it is determined that the node is the first-level node under the three-dimensional virtual space node, determining that a position and a rotation direction of an object associated with the node are free; and when it is determined that the node is not the first-level node under the three-dimensional virtual space node, obtaining a node type of the node and a node type of a parent node of the node, and determining, according to the node type of the node and the node type of the parent node, the object associated with the node maintains or does not maintain a relative position relative to an object associated with the parent node, and maintains or does not maintain a relative rotation direction relative to the object associated with the parent node.

Optionally, based on a primary-secondary relationship between the objects in the three-dimensional virtual space, the objects in the three-dimensional virtual space are associated with the nodes arranged as a tree structure under the three-dimensional virtual space node.

Optionally, the node type comprises a standard node type, a hinge node type, a slider node type, and a stabilizer node type.

Optionally, when the node type is the standard node type, a position property of a standard node is locked in all dimensions, and a rotation property of the standard node is locked in all dimensions;

when the node type is the hinge node type, a position property of a hinge node is locked in all dimensions, and a rotation property of the hinge node is free in one dimension and locked in other dimensions;

when the node type is the slider node type, a position property of a slider node is free in one dimension and locked in other dimensions, and a rotation property of the slider node is locked in all dimensions; and when the node type is the stabilizer node type, a position property of a stabilizer node is free in all dimensions, and a rotation property of the stabilizer node is locked in all dimensions.

Optionally, the determining, according to the node type of the node and the node type of the parent node, the object associated with the node maintains or does not maintain a relative position relative to an object associated with the parent node, and maintains or does not maintain a relative rotation direction relative to the object associated with the parent node, comprising:

according to the node type of the node and the node type of the parent node, respectively determining in each dimension whether position properties of the node and the parent node are both locked, and whether rotation properties of the node and the parent node are both locked;

when it is determined in a certain dimension that the position properties of the node and the parent node are both locked, determining in this dimension that the object associated with the node maintains a relative position relative to the object associated with the parent node;

when it is determined in a certain dimension that the rotation properties of the node and the parent node are both locked, determining in this dimension that the object associated with the node maintains a relative rotation direction relative to the object associated with the parent node;

when it is determined in a certain dimension that the position properties of the node and the parent node are not both locked, determining in this dimension that the object associated with the node does not maintain a relative position relative to the object associated with the parent node; and when it is determined in a certain dimension that the rotation properties of the node and the parent node are not both locked, determining in this dimension that the object associated with the node does not maintain a relative rotation direction relative to the object associated with the parent node.

An implementation of the present invention discloses a system for describing a relationship between objects in a three-dimensional virtual space, wherein the objects in the three-dimensional virtual space are associated with nodes arranged as a tree structure under a three-dimensional virtual space node, and the system comprises a judging unit, a determining unit and an obtaining unit;

the judging unit determines whether a node of the nodes is a first-level node under the three-dimensional virtual space node;

when the judging unit determines that the node is the first-level node under the three-dimensional virtual space node, the determining unit determines that a position and a rotation direction of an object associated with the node are free; and when the judging unit determines that the node is not the first-level node under the three-dimensional virtual space node, the obtaining unit obtains a node type of the node and a node type of a parent node of the node, and the determining unit determines, according to the node type of the node and the node type of the parent node, the object associated with the node maintains or does not maintain a relative position relative to an object associated with the parent node, and maintains or does not maintain a relative rotation direction relative to the object associated with the parent node.

Optionally, based on a primary-secondary relationship between the objects in the three-dimensional virtual space, the objects in the three-dimensional virtual space are associated with the nodes arranged as a tree structure under the three-dimensional virtual space node.

Optionally, the node type comprises a standard node type, a hinge node type, a slider node type, and a stabilizer node type.

Optionally, when the node type is the standard node type, a position property of a standard node is locked in all dimensions, and a rotation property of the standard node is locked in all dimensions;

when the node type is the hinge node type, a position property of a hinge node is locked in all dimensions, and a rotation property of the hinge node is free in one dimension and locked in other dimensions;

when the node type is the slider node type, a position property of a slider node is free in one dimension and locked in other dimensions, and a rotation property of the slider node is locked in all dimensions; and when the node type is the stabilizer node type, a position property of a stabilizer node is free in all dimensions, and a rotation property of the stabilizer node is locked in all dimensions.

Optionally, the determining unit determines, according to the node type of the node and the node type of the parent node, the object associated with the node maintains or does not maintain a relative position relative to an object associated with the parent node, and maintains or does not maintain a relative rotation direction relative to the object associated with the parent node, comprising:

according to the node type of the node and the node type of the parent node, the judging unit respectively determines in each dimension whether position properties of the node and the parent node are both locked, and whether rotation properties of the node and the parent node are both locked;

when the judging unit determines in a certain dimension that the position properties of the node and the parent node are both locked, the determining unit determines in this dimension that the object associated with the node maintains a relative position relative to the object associated with the parent node;

when the judging unit determines in a certain dimension that the rotation properties of the node and the parent node are both locked, the determining unit determines in this dimension that the object associated with the node maintains a relative rotation direction relative to the object associated with the parent node;

when the judging unit determines in a certain dimension that the position properties of the node and the parent node are not both locked, the determining unit determines in this dimension that the object associated with the node does not maintain a relative position relative to the object associated with the parent node; and when the judging unit determines in a certain dimension that the rotation properties of the node and the parent node are not both locked, the determining unit determines in this dimension that the object associated with the node does not maintain a relative rotation direction relative to the object associated with the parent node.

An implementation of the present invention discloses a device for describing a relationship between objects in a three-dimensional virtual space, wherein the device comprises a memory storing computer-executable instructions and a processor, the processor is configured to execute the instructions to implement a method for describing a relationship between objects in a three-dimensional virtual space, wherein the objects in the three-dimensional virtual space are associated with nodes arranged as a tree structure under a three-dimensional virtual space node, and the method comprises:

determining whether a node of the nodes is a first-level node under the three-dimensional virtual space node;

when it is determined that the node is the first-level node under the three-dimensional virtual space node, determining that a position and a rotation direction of an object associated with the node are free; and when it is determined that the node is not the first-level node under the three-dimensional virtual space node, obtaining a node type of the node and a node type of a parent node of the node, and determining, according to the node type of the node and the node type of the parent node, the object associated with the node maintains or does not maintain a relative position relative to an object associated with the parent node, and maintains or does not maintain a relative rotation direction relative to the object associated with the parent node.

An implementation of the present invention discloses a computer storage medium encoded with a computer program, wherein the computer program comprises instructions that are executed by one or more computers to implement a method for describing a relationship between objects in a three-dimensional virtual space, wherein the objects in the three-dimensional virtual space are associated with nodes arranged as a tree structure under a three-dimensional virtual space node, and the method comprises:

determining whether a node of the nodes is a first-level node under the three-dimensional virtual space node;

when it is determined that the node is the first-level node under the three-dimensional virtual space node, determining that a position and a rotation direction of an object associated with the node are free; and when it is determined that the node is not the first-level node under the three-dimensional virtual space node, obtaining a node type of the node and a node type of a parent node of the node, and determining, according to the node type of the node and the node type of the parent node, the object associated with the node maintains or does not maintain a relative position relative to an object associated with the parent node, and maintains or does not maintain a relative rotation direction relative to the object associated with the parent node.

Compared with the prior art, main differences and effects of the implementations of the present invention are as follows:

In the present invention, objects in a three-dimensional virtual space are associated with nodes arranged as a tree structure under a three-dimensional virtual space node. More specifically, based on a primary-secondary relationship between the objects in the three-dimensional virtual space, the objects in the three-dimensional virtual space are associated with the nodes arranged as a tree structure under the three-dimensional virtual space node, so that the relationship between multiple objects in the three-dimensional virtual space can be intuitively described, visualization for editing can be implemented, and understanding costs of users can be reduced.

In the present invention, when it is determined that the node is not the first-level node under the three-dimensional virtual space node, a node type of the node and a node type of a parent node of the node are obtained, and according to the node type of the node and the node type of the parent node, it is determined that the object associated with the node maintains or does not maintain a relative position relative to an object associated with the parent node, and maintains or does not maintain a relative rotation direction relative to the object associated with the parent node, so that relative positions and relative rotation directions of multiple objects in the three-dimensional virtual space can be automatically determined, and it is convenient for users to perform operations.

DETAILED DESCRIPTION

In order to make objectives and technical solutions of the embodiments of the present invention clearer, the technical solutions of the embodiments of the present invention are described clearly and completely with reference to the accompanying drawings of the embodiments of the present invention. Obviously, the described embodiments are part of the embodiments of the present invention, rather than all of the embodiments. Based on the described embodiments of the present invention, all other embodiments obtained by a person of ordinary skill in the art without creative efforts shall fall within the protection scope of the present invention.

According to implementations of the present invention, an implementation of a method for describing a relationship between objects in a three-dimensional virtual space is provided. It should be noted that steps shown in the flowchart of the accompanying drawings can be performed in a computer system that can execute instructions. Although a logical sequence is shown in the flowchart, in some cases, the shown or described steps may be performed in a sequence different from the sequence herein.

Figure 1:
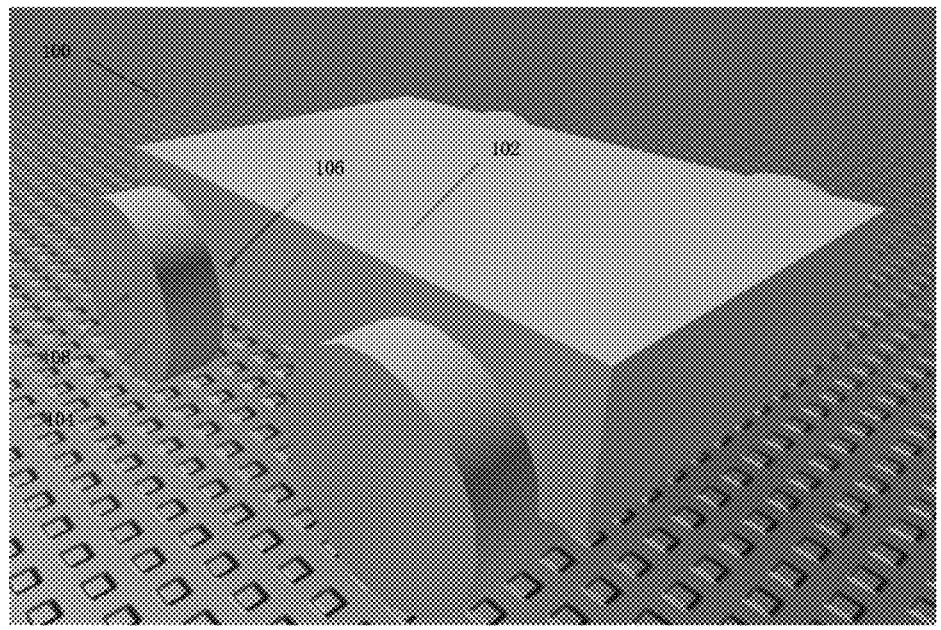
FIG. 1 is a schematic diagram of a car according to the prior art.
Figure 2:
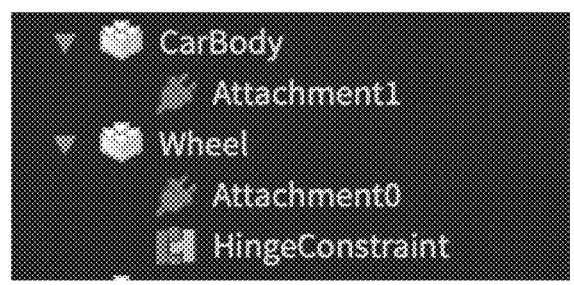
FIG. 2 is a schematic diagram of a node list according to the prior art.
Figure 3:
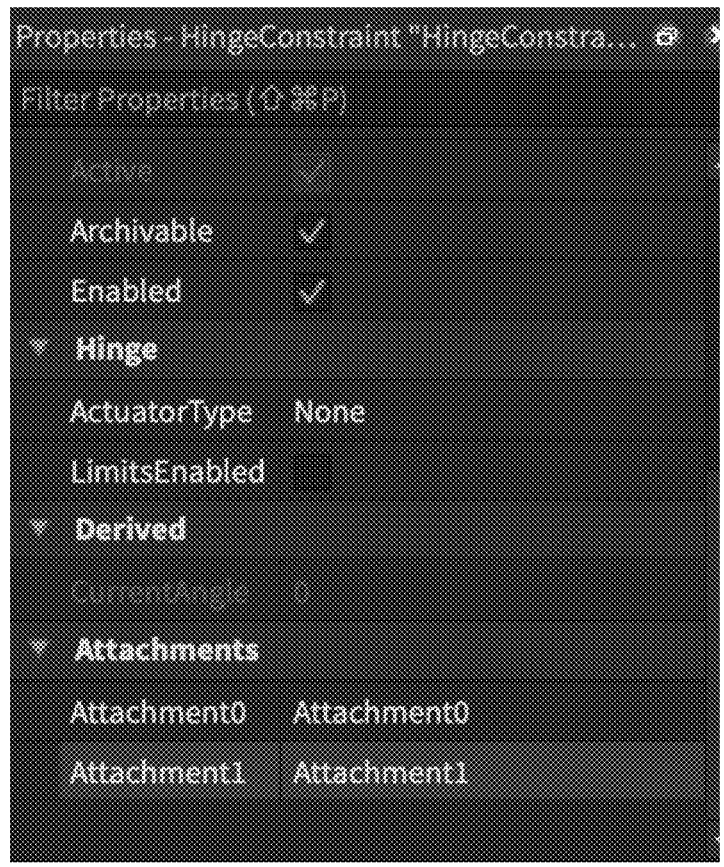
FIG. 3 is a schematic diagram of properties of a hinge node according to the prior art.
Figure 4:
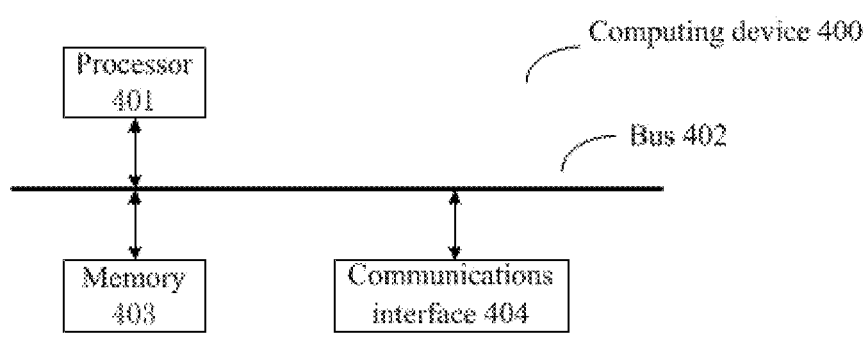
FIG. 4 is a schematic structural diagram of a computing device according to the present invention.

The method implementation provided in the implementations of the present application can be performed in a computing device. FIG. 4 is a schematic structural diagram of a computing device according to the present invention. As shown in FIG. 4, the computing device 400 may include one or more (only one is shown in the figure) processors 401 (the processor 401 may include, but is not limited to, a central processing unit CPU, a graphics processing unit GPU, a digital signal processor DSP, a micro control unit MCU, or a processing device such as a field programmable gate array FPGA), a bus 402, a memory 403 for storing data, and a communications interface 404 for communication functions. A person of ordinary skill in the art can understand that the structure shown in FIG. 4 is only for illustration, and does not limit the structure of the above electronic device. For example, the computing device 400 may further include more or fewer components than that shown in FIG. 4, or have a different configuration from that shown in FIG. 4.

The memory 403 can be used to store software programs and modules of databases, queues, and application software, such as program instructions/modules corresponding to the method for describing a relationship between objects in a three-dimensional virtual space in the implementation of the present invention. The processor 401 runs the software programs and modules stored in the memory 403, to execute various functional applications and data processing, that is, to implement the method for describing a relationship between objects in a three-dimensional virtual space. The memory 403 may include a high-speed random access memory, and may further include a non-volatile memory, such as one or more magnetic storage devices, a flash memory, or another non-volatile solid-state memory. In some examples, the memory 403 may further include memories remotely provided relative to the processors 401, and these remote memories may be connected to the computing device 400 through a network. An example of the network includes, but is not limited to, Internet, an intranet, a local area network, a mobile communication network, and a combination thereof.

The communications interface 404 is used to receive or send data through a network, and the network may include various connection types, such as wired/wireless communication links, or fiber optic cables. The specific example of the network may include Internet provided by a communication provider of the computing device 400.

Figure 7:
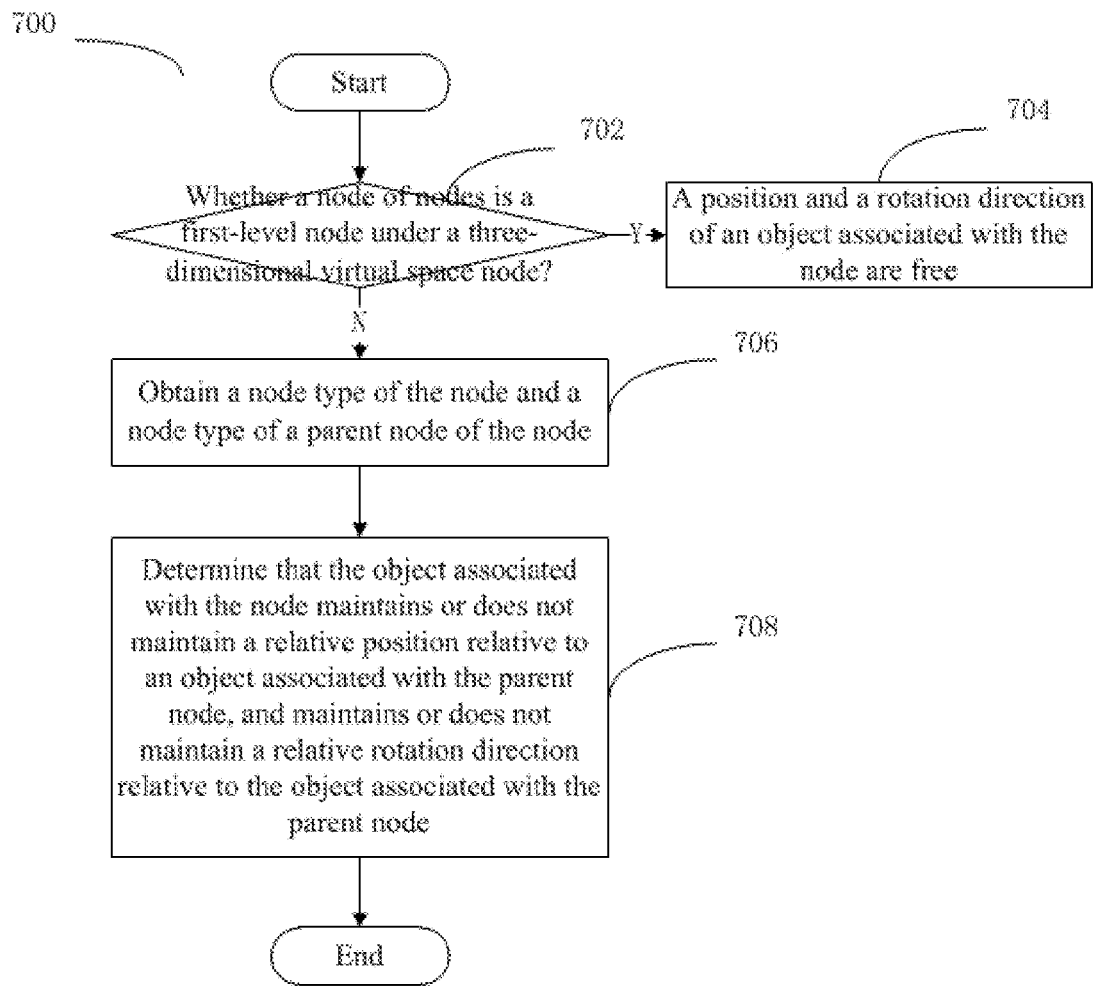
FIG. 7 is a flowchart of a method for describing a relationship between objects in a three-dimensional virtual space according to a first implementation of the present invention.

In the above operating environment, the present invention provides a method for describing a relationship between objects in a three-dimensional virtual space as shown in FIG. 7. The method can be applied to the computing device and performed by the processor in the computing device. At least one application program is installed in the computing device. The type of the application program is not limited in the implementations of the present invention, and may be a system application program or a software application program.

Figure 5:
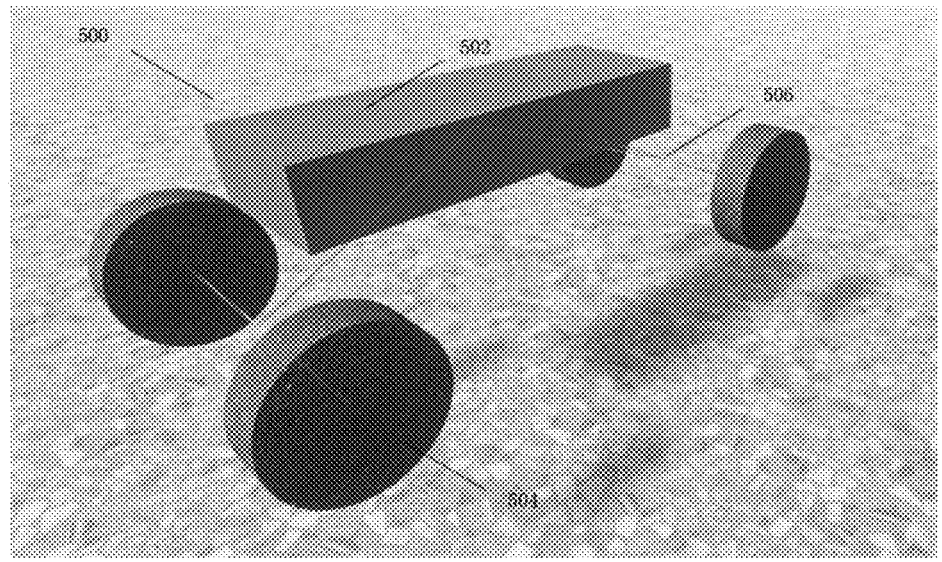
FIG. 5 is a schematic view of a car according to the present invention.

FIG. 5 is a schematic diagram of a car according to the present invention. As shown in FIG. 5, a car 500 includes a car body 502 and four wheels 504, the car body 502 and the four wheels 504 may be connected by a connector such as a hinge 506, so that the car body 502 and the four wheels 504 are associated or cooperate with each other, and when the car body 502 moves, the four wheels 504 can rotate together along a moving direction of the car body 502.

Figure 6:
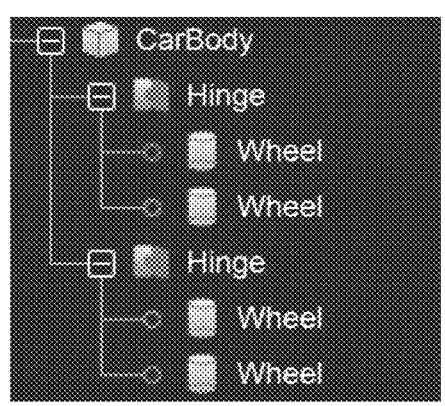
FIG. 6 is a schematic diagram of a node list according to the present invention.

FIG. 6 is a schematic diagram of a node list according to the present invention. A three-dimensional modeling platform may include a three-dimensional virtual space and a node list, the three-dimensional virtual space is used for displaying and editing objects in the three-dimensional virtual space, the node list is used for displaying and editing nodes, and the objects are associated with the nodes. The node list is arranged as a tree structure. A three-dimensional virtual space node is used as a root node of the tree structure, is an ancestor node of all other nodes, and is associated with the three-dimensional virtual space. The other nodes are first-level nodes and second-level nodes, etc. under the three-dimensional virtual space node. The first-level node under the three-dimensional virtual space node takes the three-dimensional virtual space node as a parent node, and the second-level node under the three-dimensional virtual space node takes the first-level node as a parent node, and so on.

As shown in FIG. 6, respective components of the car 500 in the three-dimensional virtual space shown in FIG. 5 are associated with nodes arranged as a tree structure under the three-dimensional virtual space node (not shown). For example, the car body 502 is associated with a car body node CarBody, the four wheels 504 are respectively associated with the four wheel nodes Wheel, and two hinges 506 are respectively associated with the two hinge nodes Hinge. When a user selects the car body 502 in the three-dimensional virtual space, the car body node CarBody can be selected in the node list at the same time. When the user edits the wheel 504 in the three-dimensional virtual space, related properties of the wheel node Wheel can be edited in the node list at the same time. It can be understood that the number of nodes in the node list may or may not be the same as the number of objects in the three-dimensional virtual space.

Optionally, based on a primary-secondary relationship between the objects in the three-dimensional virtual space, the objects in the three-dimensional virtual space are associated with the nodes arranged as a tree structure under the three-dimensional virtual space node.

The primary-secondary relationship between the objects in the three-dimensional virtual space may indicate that a sub-object follows a main object. The primary-secondary relationship can include one or more of the following: a hard object is the main object, a soft object is a sub-object, and the soft object follows the hard object; a single large object is the main object, and several identical or similar small objects are sub-objects, and the several identical or similar small objects follow the single large object; an object fixed relative to the three-dimensional virtual space is the main object, an object moving relative to the three-dimensional virtual space is the sub-object, and the object moving relative to the three-dimensional virtual space follows the object fixed relative to the three-dimensional virtual space. For example, a flagpole is the main object, a flag is the sub-object, and the flag follows the flagpole; a body is the main object, fur is the sub-object, and the fur follows the body; a light source is the main object, a moth is the sub-object, and the moth follows the light source. It can be understood that the primary-secondary relationship may further include another primary-secondary relationship that is well known to a person skilled in the art. This is not limited herein. In addition, the primary-secondary relationship can be nested at multiple levels.

For example, for respective components of the car 500 in the three-dimensional virtual space shown in FIG. 5, it can be assumed that in this example, the car body 502 is the main object, the two hinges 506 are sub-objects of the car body 502, and the two pairs of wheels 504 are sub-objects of the two hinges 506 respectively. As shown in FIG. 6, based on the primary-secondary relationship, the car body node CarBody is a parent node, the two hinge nodes Hinge are child nodes of the car body node CarBody, and the two pairs of wheel nodes Wheel are respectively child nodes of the two hinge nodes Hinge. The car body 502, the hinge 506 and the wheel 504 in the three-dimensional virtual space are associated with the car body node CarBody, the hinge node Hinge and the wheel node Wheel which are arranged as a tree structure under the three-dimensional virtual space node.

In the present invention, objects in the three-dimensional virtual space are associated with nodes arranged as a tree structure under a three-dimensional virtual space node. More specifically, based on the primary-secondary relationship between the objects in the three-dimensional virtual space, the objects in the three-dimensional virtual space are associated with the nodes arranged as a tree structure under the three-dimensional virtual space node, so that the relationship between multiple objects in the three-dimensional virtual space can be intuitively described, visualization for editing can be implemented, and understanding costs of the user can be reduced.

A first implementation of the present invention relates to a method for describing a relationship between objects in a three-dimensional virtual space. The objects in the three-dimensional virtual space are associated with nodes arranged as a tree structure under a three-dimensional virtual space node.

FIG. 7 is a flowchart of a method for describing a relationship between objects in a three-dimensional virtual space according to the first implementation of the present invention. As shown in FIG. 7, the method 700 includes the following steps:

At 702: Determine whether a node of nodes is a first-level node under a three-dimensional virtual space node.

At 704: When it is determined that the node is the first-level node under the three-dimensional virtual space node, determine that a position and a rotation direction of an object associated with the node are free.

At 706: When it is determined that the node is not the first-level node under the three-dimensional virtual space node, obtain a node type of the node and a node type of a parent node of the node. In addition, at 708: According to the node type of the node and the node type of the parent node, determine that the object associated with the node maintains or does not maintain a relative position relative to an object associated with the parent node, and maintains or does not maintain a relative rotation direction relative to the object associated with the parent node.

For example, it is respectively determined whether the car body node CarBody, the two hinge nodes Hinge and the four wheel nodes Wheel shown in FIG. 6 are first-level nodes under the three-dimensional virtual space node. It can be understood that, for some tree-like nodes shown in FIG. 6, it may also be determined whether the root nodes of some tree-like nodes are first-level nodes under the three-dimensional virtual space node, that is, it may be only determined whether the car body node CarBody is a first-level node under the three-dimensional virtual space node.

If the car body node CarBody is the first-level node under the three-dimensional virtual space node, the two hinge nodes Hinge and the four wheel nodes Wheel are not the first-level nodes under the three-dimensional virtual space node.

When it is determined that the car body node CarBody is the first-level node under the three-dimensional virtual space node, it is determined that a position and a rotation direction of the car body 502 associated with the car body node CarBody are free.

It can be assumed that in this example, the car body node CarBody is not the first-level node under the three-dimensional virtual space node, and the two hinge nodes Hinge and the four wheel nodes are not the first-level nodes under the three-dimensional virtual space node.

When it is determined that the car body node CarBody is not the first-level node under the three-dimensional virtual space node, a node type of the car body node CarBody and a node type of a parent node (not shown) of the car body node CarBody are obtained, and according to the node type of the car body node CarBody Type and the node type of the parent node, it is determined the car body 502 associated with the car body node CarBody maintains or does not maintain a relative position relative to an object (not shown) associated with the parent node, and maintains or does not maintain a relative rotation direction relative to the object (not shown) associated with the parent node.

When it is determined that the hinge node Hinge is not the first-level node under the three-dimensional virtual space node, a node type of the hinge node Hinge and a node type of a parent node of the hinge node Hinge (that is, the car body node CarBody) are obtained, and according to the node type of the hinge node Hinge and the node type of the car body node CarBody, it is determined that the hinge 506 associated with the hinge node Hinge maintains or does not maintain a relative position relative to the body 502 associated with the car body node CarBody, and maintains or does not maintain a relative rotation direction relative to the body 502 associated with the car body node CarBody.

When it is determined that the wheel node Wheel is not the first-level node under the three-dimensional virtual space node, a node type of the wheel node Wheel and a node type of a parent node of the wheel node Wheel (that is, the hinge node Hinge) are obtained. According to the node type of the wheel node Wheel and the node type of the hinge node Hinge, it is determined the wheel 504 associated with the wheel node Wheel maintains or does not maintain a relative position relative to the hinge 506 associated with the hinge node Hinge, and maintains or does not maintain a relative rotation direction relative to the hinge 506 associated with the hinge node Hinge.

In the present invention, when it is determined that a node is not the first-level node under the three-dimensional virtual space node, a node type of the node and a node type of a parent node of the node are obtained, and according to the node type of the node and the node type of the parent node, it is determined that an object associated with the node maintains or does not maintain a relative position relative to an object associated with the parent node, and maintains or does not maintain a relative rotation direction relative to the object associated with the parent node, so that the relative positions and relative rotation directions of multiple objects in the three-dimensional virtual space can be automatically determined, and it is convenient for users to perform operations.

It can be understood that, in the above node list arranged in a tree structure, there may be no three-dimensional virtual space node. In this case, it can be determined whether a node has a parent node. When it is determined that the node does not have a parent node, it is determined that a position and a rotation direction of an object associated with the node are free. When it is determined that the node has a parent node, a node type of the node and a node type of the parent node of the node are obtained, and according to the node type of the node and the node type of the parent node, it is determined the object associated with the node maintains or does not maintain a relative position relative to an object associated with the parent node, and maintains or does not maintain a relative rotation direction relative to the object associated with the parent node.

Optionally, the node type comprises a standard node type, a hinge node type, a slider node type, and a stabilizer node type.

An object associated with a standard node can include an object having a basic shape such as a cube and a sphere, or may include an imported model. An object associated with a hinge node can include a hinge. An object associated with a slider node may include a slider. An object associated with a stabilizer node may include a stabilizer.

Optionally, when the node type is the standard node type, a position property of a standard node is locked in all dimensions, and a rotation property of the standard node is locked in all dimensions.

When the node type is the hinge node type, a position property of a hinge node is locked in all dimensions, and a rotation property of the hinge node is free in one dimension and locked in other dimensions.

When the node type is the slider node type, a position property of a slider node is free in one dimension and locked in other dimensions, and a rotation property of the slider node is locked in all dimensions.

When the node type is the stabilizer node type, a position property of a stabilizer node is free in all dimensions, and a rotation property of the stabilizer node is locked in all dimensions.

As shown in Table 1 below, different node types have different properties, and this indicates whether position and rotation in each dimension are locked. The rotation property of the hinge node is free in an X dimension, and the position property of the slider node is free in an X dimension. It can be understood that the rotation property of the hinge node can also be free in a Y or Z dimension, and the position property of the slider node can also be free in a Y or Z dimension. This is not limited herein.

TABLE 1

Position properties and rotation properties of different node types

| Node type | Position X | Position Y | Position Z | Rotation X | Rotation Y | Rotation Z |
|---|---|---|---|---|---|---|
| Standard node | Locked | Locked | Locked | Locked | Locked | Locked |
| Hinge node | Locked | Locked | Locked | Free | Locked | Locked |
| Slider node | Free | Locked | Locked | Locked | Locked | Locked |
| Stabilizer node | Free | Free | Free | Locked | Locked | Locked |

Optionally, it is determined, according to the node type of the node and the node type of the parent node, that the object associated with the node maintains or does not maintain a relative position relative to the object associated with the parent node, and maintains or does not maintain a relative rotation direction relative to the object associated with the parent node, including the following contents:

According to the node type of the node and the node type of the parent node, it is determined whether the position properties of the node and the parent node are both locked, and whether the rotation properties of the node and the parent node are both locked in each dimension.

When it is determined in a certain dimension that the position properties of the node and the parent node are both locked, it is determined in this dimension that the object associated with the node maintains a relative position relative to the object associated with the parent node.

When it is determined in a certain dimension that the rotation properties of the node and the parent node are both locked, it is determined in this dimension that the object associated with the node maintains a relative rotation direction relative to the object associated with the parent node.

When it is determined in a certain dimension that the position properties of the node and the parent node are not both locked, it is determined in this dimension that the object associated with the node does not maintain a relative position relative to the object associated with the parent node.

When it is determined in a certain dimension that the rotation properties of the node and the parent node are not both locked, it is determined in this dimension that the object associated with the node does not maintain a relative rotation direction relative to the object associated with the parent node.

For example, according to the node type of the car body node CarBody and the node type of the parent node (not shown), it is determined in each dimension whether the position properties of the car body node CarBody and the parent node are both locked, and whether the rotation properties of the car body node CarBody and the parent node are both locked. According to the node type of the hinge node Hinge and the node type of the parent node (that is, the car body node CarBody), it is determined in each dimension whether the position properties of the hinge node Hinge and the car body node CarBody are both locked in each dimension, and whether the rotation properties of the hinge node Hinge and the car body node CarBody are both locked. According to the node type of the wheel node Wheel and the node type of the parent node (the hinge node Hinge), it is determined in each dimension whether the position properties of the wheel node Wheel and the hinge node Hinge are both locked, and whether the rotation properties of the wheel node Wheel and the hinge node Hinge are both locked.

It can be assumed that in this example, the node types of the car body node CarBody and the wheel node Wheel are standard node types, and the node type of the hinge node Hinge is the hinge node type.

Referring to Table 1 above, for the hinge node Hinge, the position properties of the hinge node Hinge and the car body node CarBody are locked in the X, Y and Z dimensions, and it is determined that the hinge 506 associated with the hinge node Hinge maintains a relative position in the X, Y and Z dimensions relative to the car body 502 associated with the car body node CarBody, that is, the hinge 506 cannot move relative to the car body 502 in the X, Y and Z dimensions.

The rotation property of hinge node Hinge is not locked in the X dimension and the rotation property of the car body node CarBody is locked. It is determined that the hinge 506 associated with the hinge node Hinge does not maintain a relative rotation direction in the X dimension relative to the car body 502 associated with the body node CarBody, that is, the hinge 506 can rotate relative to the car body 502 in the X dimension.

The rotation properties of the hinge node Hinge and the body node CarBody are locked in the Y and Z dimensions, and it is determined that the hinge 506 associated with the hinge node Hinge maintains a relative rotation direction in the Y and Z dimensions relative to the body associated with the car body node CarBody 502, that is, the hinge 506 cannot rotate relative to the car body 502 in the Y and Z dimensions.

For the wheel node Wheel, the position properties of the wheel node Wheel and the hinge node Hinge are locked in the X, Y and Z dimensions, and it is determined that the wheel 504 associated with the wheel node Wheel maintains a relative position in the X, Y and Z dimensions relative to the hinge 506 associated with the node Hinge, that is, the wheel 504 cannot move relative to the hinge 506 in the X, Y and Z dimensions.

The rotation property of the wheel node Wheel is locked in the X dimension and the rotation property of the hinge node Hinge is not locked, it is determined that the wheel 504 associated with the wheel node Wheel does not maintain a relative rotation direction in the X dimension relative to the hinge 506 associated with the hinge node Hinge, that is, the wheel 504 can rotate relative to the hinge 506 in the X dimension.

The rotation properties of the wheel node Wheel and the hinge node Hinge are locked in the Y and Z dimensions, it is determined that the wheel 504 associated with the wheel node Wheel maintains a relative rotation direction in the Y and Z dimensions relative to the hinge 506 associated with the hinge node Hinge, that is, the wheel 504 cannot rotate relative to the hinge 506 in the Y and Z dimensions.

Thus, in this example, the user can create the car body 502 and place the car body 502 at a desired position; create two hinges 506 and place the two hinges 506 at desired positions relative to the car body 502; create four wheels 504 and place four wheels 504 in the desired positions relative to the two hinges 506. Then, as described above, the hinge 506 cannot move relative to the car body 502 in the X, Y and Z dimensions, the hinge 506 can rotate relative to the car body 502 in the X dimension and the hinge 506 cannot rotate in the Y and Z dimensions relative to the car body 502, and the wheel 504 cannot move relative to the hinge 506 in the X, Y and Z dimensions, the wheel 504 can rotate relative to the hinge 506 in the X dimension and the wheel 504 cannot rotate relative to the hinge 506 in the Y and Z dimensions. Therefore, when the car body 502 starts to move, the four wheels 504 can rotate together along a moving direction of the car body 502.

A second implementation of the present invention relates to a system for describing a relationship between objects in a three-dimensional virtual space, and the objects in the three-dimensional virtual space are associated with nodes arranged as a tree structure under a three-dimensional virtual space node.

Figure 8:
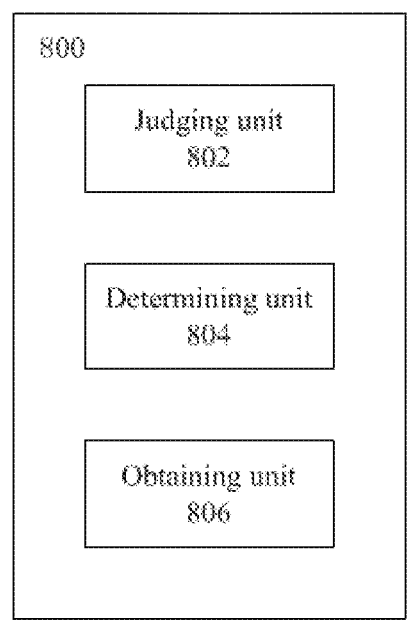
FIG. 8 is a structural diagram of a system for describing a relationship between objects in a three-dimensional virtual space according to a second implementation of the present invention.

FIG. 8 is a structural diagram of a system for describing a relationship between objects in a three-dimensional virtual space according to a second embodiment of the present invention. As shown in FIG. 8, the system 800 includes a judging unit 802, a determining unit 804 and an obtaining unit 806.

The judging unit 802 determines whether a node of nodes is a first-level node under a three-dimensional virtual space node.

When the judging unit 802 determines that the node is the first-level node under the three-dimensional virtual space node, the determining unit 804 determines that a position and a rotation direction of an object associated with the node are free.

When the judging unit 802 determines that the node is not the first-level node under the three-dimensional virtual space node, the obtaining unit 806 obtains a node type of the node and a node type of a parent node of the node, and the determining unit 804 determines, according to the node type of the node and the node type of the parent node, that the object associated with the node maintains or does not maintain a relative position relative to an object associated with the parent node, and maintains or does not maintain a relative rotation direction relative to the object associated with the parent node.

Optionally, based on a primary-secondary relationship between the objects in the three-dimensional virtual space, the objects in the three-dimensional virtual space are associated with the nodes arranged as a tree structure under the three-dimensional virtual space node.

Optionally, the node type comprises a standard node type, a hinge node type, a slider node type, and a stabilizer node type.

Optionally, when the node type is the standard node type, a position property of a standard node is locked in all dimensions, and a rotation property of the standard node is locked in all dimensions.

When the node type is the hinge node type, a position property of a hinge node is locked in all dimensions, and a rotation property of the hinge node is free in one dimension and locked in other dimensions.

When the node type is the slider node type, a position property of a slider node is free in one dimension and locked in other dimensions, and a rotation property of the slider node is locked in all dimensions.

When the node type is the stabilizer node type, a position property of a stabilizer node is free in all dimensions, and a rotation property of the stabilizer node is locked in all dimensions.

Optionally, the determining unit 804 determines, according to the node type of the node and the node type of the parent node, that the object associated with the node maintains or does not maintain a relative position relative to an object associated with the parent node, and maintains or does not maintain a relative rotation direction relative to the object associated with the parent node, including the following contents:

The judging unit 802 determines, according to the node type of the node and the node type of the parent node, whether the position properties of the node and the parent node are both locked, and whether the rotation properties of the node and the parent node are both locked in each dimension.

When the judging unit 802 determines in a certain dimension that the position properties of the node and the parent node are both locked, the determining unit 804 determines in this dimension that the object associated with the node maintains a relative position relative to the object associated with the parent node.

When the judging unit 802 determines in a certain dimension that the rotation properties of the node and the parent node are both locked, the determining unit 804 determines in this dimension that the object associated with the node maintains a relative rotation direction relative to the object associated with the parent node.

When the judging unit 802 determines in a certain dimension that the position properties of the node and the parent node are not both locked, the determining unit 804 determines in this dimension that the object associated with the node does not maintain a relative position relative to the object associated with the parent node.

When the judging unit 802 determines in a certain dimension that rotation properties of the node and the parent node are not both locked, the determining unit 804 determines in this dimension that the object associated with the node does not maintain a relative rotation direction relative to the object associated with the parent node.

The first implementation is a method implementation corresponding to this implementation and this implementation can be implemented in cooperation with the first implementation. The relevant technical details mentioned in the first implementation are still valid in this implementation. In order to reduce repetition, details are not described herein. Correspondingly, the related technical details mentioned in this implementation can also be applied to the first implementation.

A third implementation of the present invention relates to a device for describing a relationship between objects in a three-dimensional virtual space, the device comprises a memory storing computer-executable instructions and a processor, the processor is configured to execute the instructions to implement a method for describing a relationship between objects in a three-dimensional virtual space, the objects in the three-dimensional virtual space are associated with nodes arranged as a tree structure under a three-dimensional virtual space node, and the method comprises:
  determining whether a node of the nodes is a first-level node under the three-dimensional virtual space node;
  when it is determined that the node is the first-level node under the three-dimensional virtual space node, determining that a position and a rotation direction of an object associated with the node are free; and
  when it is determined that the node is not the first-level node under the three-dimensional virtual space node, obtaining a node type of the node and a node type of a parent node of the node, and determining, according to the node type of the node and the node type of the parent node, that the object associated with the node maintains or does not maintain a relative position relative to an object associated with the parent node, and maintains or does not maintain a relative rotation direction relative to the object associated with the parent node.

The first implementation is a method implementation corresponding to this implementation and this implementation can be implemented in cooperation with the first implementation. The relevant technical details mentioned in the first implementation are still valid in this implementation. In order to reduce repetition, details are not described herein. Correspondingly, the related technical details mentioned in this implementation can also be applied to the first implementation.

A fourth implementation of the present invention relates to a computer storage medium encoded with a computer program, the computer program includes instructions that are executed by one or more computers to implement a method for describing a relationship between objects in a three-dimensional virtual space, the objects in the three-dimensional virtual space are associated with nodes arranged as a tree structure under a three-dimensional virtual space node, and the method comprises:
  determining whether a node of the nodes is a first-level node under the three-dimensional virtual space node;
  when it is determined that the node is the first-level node under the three-dimensional virtual space node, determining that a position and a rotation direction of an object associated with the node are free; and
  when it is determined that the node is not the first-level node under the three-dimensional virtual space node, obtaining a node type of the node and a node type of a parent node of the node, and determining, according to the node type of the node and the node type of the parent node, that the object associated with the node maintains or does not maintain a relative position relative to an object associated with the parent node, and maintains or does not maintain a relative rotation direction relative to the object associated with the parent node.

The first implementation is a method implementation corresponding to this implementation and this implementation can be implemented in cooperation with the first implementation. The relevant technical details mentioned in the first implementation are still valid in this implementation. In order to reduce repetition, details are not described herein. Correspondingly, the related technical details mentioned in this implementation can also be applied to the first implementation.

It should be noted that, each method implementation of the present invention may be implemented by means of software, hardware, firmware, and the like. Regardless of whether the invention is implemented in software, hardware, or firmware, the instruction code may be stored in any type of computer-accessible memory (for example, permanent or modifiable, volatile or non-volatile, solid-state solid or non-solid, fixed or replaceable media, etc.). Likewise, the memory may be, for example, Programmable Array Logic (PAL), Random Access Memory (RAM), Programmable Read Only Memory (PROM), read-only memory (ROM), Electrically Erasable Programmable Read-Only Memory (EEPROM), magnetic disk, optical disk, Digital Versatile Disc (DVD) and so on.

It should be noted that each unit/module mentioned in each device implementation of the present invention is a logical unit/module. Physically, a logical unit may be a physical unit, a part of a physical unit, or may be implemented by a combination of multiple physical units, the physical implementation of these logical units is not the most important, and the combination of functions implemented by these logical units is the key to solving the technical problem proposed by the present invention. In addition, in order to highlight the innovative part of the present invention, the device implementation of the present invention does not introduce units that are not closely related to solving the technical problems proposed by the present invention, which does not mean that the device implementation does not have other units.

It should be noted that, in the claims and description of this patent, relational terms such as first and second, etc. are only used to distinguish one entity or operation from another entity or operation, and do not necessarily require or imply there is such actual relationship or order between these entities or operations. Moreover, the terms "comprising", "including" or any other variation thereof are intended to encompass non-exclusive inclusion such that a process, method, article or device including a list of elements includes not only those elements, but also includes other elements not explicitly listed or elements inherent to such a process, method, article or device. Without further limitation, an element qualified by the phrase "comprising a" does not preclude the presence of additional identical elements in a process, method, article or device that includes the element.

Although the present invention has been illustrated and described with reference to certain preferred embodiments thereof, a person of ordinary skill in the art should understood that various changes in form and detail may be made therein without departing from the spirit and scope of the present invention.

The invention claimed is:

1. A method for describing a relationship between objects in a three-dimensional virtual space, wherein the objects in the three-dimensional virtual space are associated with nodes arranged as a tree structure under a three-dimensional virtual space node, and the method comprises:
  determining whether a node of the nodes is a first-level node under the three-dimensional virtual space node;
  when it is determined that the node is the first-level node under the three-dimensional virtual space node, that a position and a rotation direction of an object associated with the node are free; and
  when it is determined that the node is not the first-level node under the three-dimensional virtual space node, obtaining a node type of the node and a node type of a parent node of the node, and determining, according to the node type of the node and the node type of the parent node, the object associated with the node maintains or does not maintain a relative position relative to an object associated with the parent node, and maintains or does not maintain a relative rotation direction relative to the object associated with the parent node, wherein the node type comprises a standard node type, a hinge node type, a slider node type, and a stabilizer node type, wherein when the node type is the standard node type, a position property of a standard node is locked in all dimensions, and a rotation property of the standard node is locked in all dimensions;

when the node type is the hinge node type, a position property of a hinge node is locked in all dimensions, and a rotation property of the hinge node is free in one dimension and locked in other dimensions;

when the node type is the slider node type, a position property of a slider node is free in one dimension and locked in other dimensions, and a rotation property of the slider node is locked in all dimensions; and when the node type is the stabilizer node type, a position property of a stabilizer node is free in all dimensions, and a rotation property of the stabilizer node is locked in all dimensions, and wherein the determining, according to the node type of the node and the node type of the parent node, the object associated with the node maintains or does not maintain a relative position relative to an object associated with the parent node, and maintains or does not maintain a relative rotation direction relative to the object associated with the parent node, comprising:

according to the node type of the node and the node type of the parent node, respectively determining in each dimension whether position properties of the node and the parent node are both locked, and whether rotation properties of the node and the parent node are both locked;

when it is determined in a certain dimension that the position properties of the node and the parent node are both locked, determining in this dimension that the object associated with the node maintains a relative position relative to the object associated with the parent node;

when it is determined in a certain dimension that the rotation properties of the node and the parent node are both locked, determining in this dimension that the object associated with the node maintains a relative rotation direction relative to the object associated with the parent node;

when it is determined in a certain dimension that the position properties of the node and the parent node are not both locked, determining in this dimension that the object associated with the node does not maintain a relative position relative to the object associated with the parent node; and when it is determined in a certain dimension that the rotation properties of the node and the parent node are not both locked, determining in this dimension that the object associated with the node does not maintain a relative rotation direction relative to the object associated with the parent node.

2. The method according to claim 1, wherein, based on a primary-secondary relationship between the objects in the three-dimensional virtual space, the objects in the three-dimensional virtual space are associated with the nodes arranged as a tree structure under the three-dimensional virtual space node.

3. A system for describing a relationship between objects in a three-dimensional virtual space, wherein the objects in the three-dimensional virtual space are associated with nodes arranged as a tree structure under a three-dimensional virtual space node, and the system comprises:

one or more processors; and a memory that stores instructions that, when executed by the one or more processors, cause the one or more processors to perform operations comprising:

determines determining whether a node of the nodes is a first-level node under the three-dimensional virtual space node;

when it is determined that the node is the first-level node under the three-dimensional virtual space node, determining that a position and a rotation direction of an object associated with the node are free; and when it is determined that the node is not the first-level node under the three-dimensional virtual space node, obtaining a node type of the node and a node type of a parent node of the node, and determining, according to the node type of the node and the node type of the parent node, the object associated with the node maintains or does not maintain a relative position relative to an object associated with the parent node, and maintains or does not maintain a relative rotation direction relative to the object associated with the parent node, wherein the node type comprises a standard node type, a hinge node type, a slider node type, and a stabilizer node type, wherein when the node type is the standard node type, a position property of a standard node is locked in all dimensions, and a rotation property of the standard node is locked in all dimensions;

when the node type is the hinge node type, a position property of a hinge node is locked in all dimensions, and a rotation property of the hinge node is free in one dimension and locked in other dimensions:

when the node type is the slider node type, a position property of a slider node is free in one dimension and locked in other dimensions, and a rotation property of the slider node is locked in all dimensions; and when the node type is the stabilizer node type, a position property of a stabilizer node is free in all dimensions, and a rotation property of the stabilizer node is locked in all dimensions, and wherein the determining, according to the node type of the node and the node type of the parent node, the object associated with the node maintains or does not maintain a relative position relative to an object associated with the parent node, and maintains or does not maintain a relative rotation direction relative to the object associated with the parent node, comprising:

according to the node type of the node and the node type of the parent node, respectively determining in each dimension whether position properties of the node and the parent node are both locked, and whether rotation properties of the node and the parent node are both locked;

when it is determined in a certain dimension that the position properties of the node and the parent node are both locked, determining in this dimension that the object associated with the node maintains a relative position relative to the object associated with the parent node;

when it is determined in a certain dimension that the rotation properties of the node and the parent node are both locked, determining in this dimension that the object associated with the node maintains a relative rotation direction relative to the object associated with the parent node;

when it is determined in a certain dimension that the position properties of the node and the parent node are not both locked, determining in this dimension that the object associated with the node does not maintain a relative position relative to the object associated with the parent node; and when it is determined in a certain dimension that the rotation properties of the node and the parent node are not both locked, determining in this dimension that the object associated with the node does not maintain a relative rotation direction relative to the object associated with the parent node.

4. The system according to claim 3, wherein, based on a primary-secondary relationship between the objects in the three-dimensional virtual space, the objects in the three-dimensional virtual space are associated with the nodes arranged as a tree structure under the three-dimensional virtual space node.

5. A device for describing a relationship between objects in a three-dimensional virtual space, wherein the device comprises a memory storing computer-executable instructions and a processor, the processor is configured to execute the instructions to implement a method for describing a relationship between objects in a three-dimensional virtual space, wherein the objects in the three-dimensional virtual space are associated with nodes arranged as a tree structure under a three-dimensional virtual space node, and the method comprises:

determining whether a node of the nodes is a first-level node under the three-dimensional virtual space node;

when it is determined that the node is the first-level node under the three-dimensional virtual space node, determining that a position and a rotation direction of an object associated with the node are free; and when it is determined that the node is not the first-level node under the three-dimensional virtual space node, obtaining a node type of the node and a node type of a parent node of the node, and determining, according to the node type of the node and the node type of the parent node, the object associated with the node maintains or does not maintain a relative position relative to an object associated with the parent node, and maintains or does not maintain a relative rotation direction relative to the object associated with the parent node;

wherein the node type comprises a standard node type, a hinge node type, a slider node type, and a stabilizer node type, wherein when the node type is the standard node type, a position property of a standard node is locked in all dimensions, and a rotation property of the standard node is locked in all dimensions;

when the node type is the hinge node type, a position property of a hinge node is locked in all dimensions, and a rotation property of the hinge node is free in one dimension and locked in other dimensions;

when the node type is the slider node type, a position property of a slider node is free in one dimension and locked in other dimensions, and a rotation property of the slider node is locked in all dimensions; and when the node type is the stabilizer node type, a position property of a stabilizer node is free in all dimensions, and a rotation property of the stabilizer node is locked in all dimensions, and ,wherein the determining, according to the node type of the node and the node type of the parent node, the object associated with the node maintains or does not maintain a relative position relative to an object associated with the parent node, and maintains or does not maintain a relative rotation direction relative to the object associated with the parent node. comprising:

according to the node type of the node and the node type of the parent node, respectively determining in each dimension whether position properties of the node and the parent node are both locked, and whether rotation properties of the node and the parent node are both locked;

when it is determined in a certain dimension that the position properties of the node and the parent node are both locked, determining in this dimension that the object associated with the node maintains a relative position relative to the object associated with the parent node;

when it is determined in a certain dimension that the rotation properties of the node and the parent node are both locked, determining in this dimension that the object associated with the node maintains a relative rotation direction relative to the object associated with the parent node;

when it is determined in a certain dimension that the position properties of the node and the parent node are not both locked, determining in this dimension that the object associated with the node does not maintain a relative position relative to the object associated with the parent node; and when it is determined in a certain dimension that the rotation properties of the node and the parent node are not both locked, determining in this dimension that the object associated with the node does not maintain a relative rotation direction relative to the object associated with the parent node.

6. A non-transitory computer storage medium encoded with a computer program, wherein the computer program comprises instructions that are executed by one or more computers to implement a method for describing a relationship between objects in a three-dimensional virtual space, wherein the objects in the three-dimensional virtual space are associated with nodes arranged as a tree structure under a three-dimensional virtual space node, and the method comprises:

determining whether a node of the nodes is a first-level node under the three-dimensional virtual space node;

when it is determined that the node is the first-level node under the three-dimensional virtual space node, determining that a position and a rotation direction of an object associated with the node are free; and when it is determined that the node is not the first-level node under the three-dimensional virtual space node, obtaining a node type of the node and a node type of a parent node of the node, and determining, according to the node type of the node and the node type of the parent node, the object associated with the node maintains or does not maintain a relative position relative to an object associated with the parent node, and maintains or does not maintain a relative rotation direction relative to the object associated with the parent node;

wherein the node type comprises a standard node type, a hinge node type, a slider node type, and a stabilizer node type, wherein when the node type is the standard node type, a position property of a standard node is locked in all dimensions, and a rotation property of the standard node is locked in all dimensions;

when the node type is the hinge node type, a position property of a hinge node is locked in all dimensions, and a rotation property of the hinge node is free in one dimension and locked in other dimensions;

when the node type is the slider node type, a position property of a slider node is free in one dimension and locked in other dimensions, and a rotation property of the slider node is locked in all dimensions; and when the node type is the stabilizer node type, a position property of a stabilizer node is free in all dimensions, and a rotation property of the stabilizer node is locked in all dimensions, and wherein the determining, according to the node type of the node and the node type of the parent node, the object associated with the node maintains or does not maintain a relative position relative to an object associated with the parent node, and maintains or does not maintain a relative rotation direction relative to the object associated with the parent node, comprising:

according to the node type of the node and the node type of the parent node, respectively determining in each dimension whether position properties of the node and the parent node are both locked, and whether rotation properties of the node and the parent node are both locked;

when it is determined in a certain dimension that the position properties of the node and the parent node are both locked, determining in this dimension that the object associated with the node maintains a relative position relative to the object associated with the parent node;

when it is determined in a certain dimension that the rotation properties of the node and the parent node are both locked, determining in this dimension that the object associated with the node maintains a relative rotation direction relative to the object associated with the parent node;

when it is determined in a certain dimension that the position properties of the node and the parent node are not both locked, determining in this dimension that the object associated with the node does not maintain a relative position relative to the object associated with the parent node; and when it is determined in a certain dimension that the rotation properties of the node and the parent node are not both locked, determining in this dimension that the object associated with the node does not maintain a relative rotation direction relative to the object associated with the parent node.

* * * * *